Feb. 17, 1925.
W. R. McGOWEN
AUTOMOBILE BUMPER
Filed July 12, 1924
1,526,427
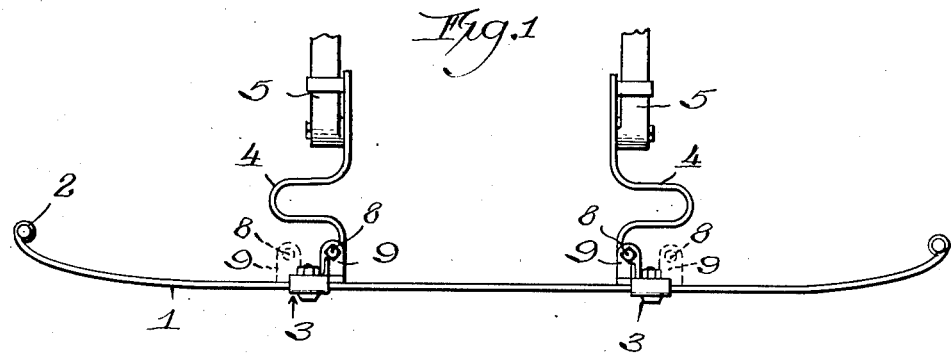
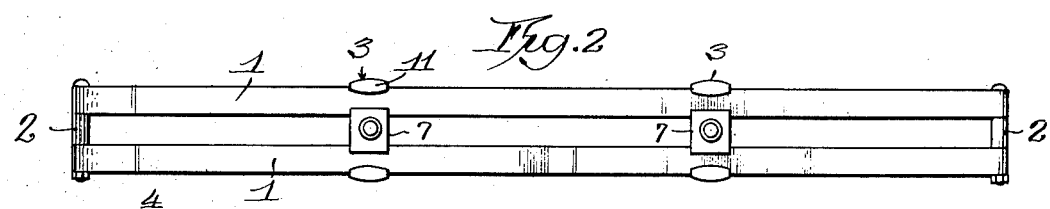
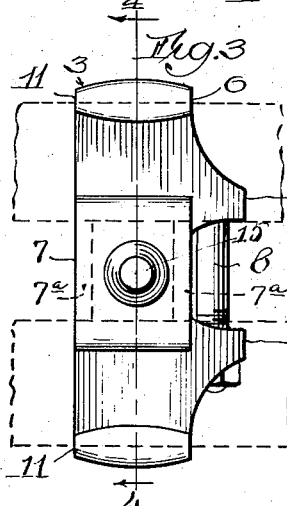
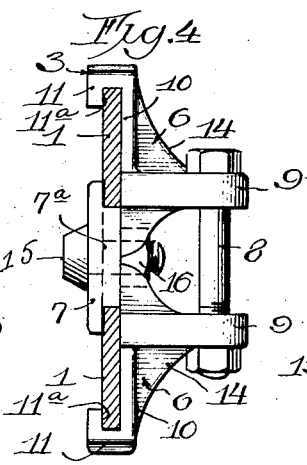
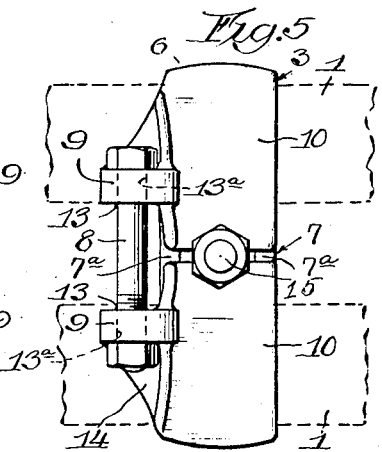
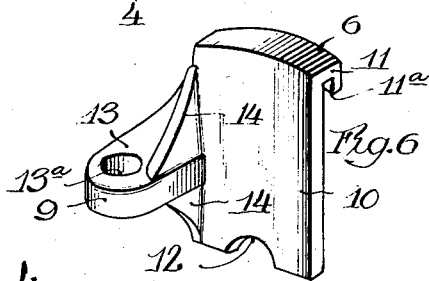
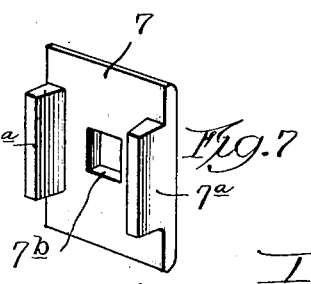
Witness:
Chas. R. Koursl.
Inventor,
William R. McGowen
By Offield, Nehlhose, Litt & Toole Attys Patented Feb. 17, 1925.

1,526,427

UNITED STATES PATENT OFFICE.

WILLIAM R. McGOWEN, OF PITTSBURGH, PENNSYLVANIA.

AUTOMOBILE BUMPER.

Application filed July 12, 1924. Serial No. 725,598.

*To all whom it may concern:*

Be it known that I, WILLIAM R. McGOWEN, a citizen of the United States of America, and a resident of Pittsburgh, in the county of Allegheny and State of Pennsylvania, have invented a certain new and useful Improvement in Automobile Bumpers, of which the following is a specification.

This invention relates to improvements in automobile bumpers and more particularly to bumpers consisting of resilient bars extending the length of the bumper and spaced apart vertically, these bars being clamped or otherwise secured together at points throughout their length and attached to the automobile by means of intermediate connecting hangers or brackets.

The object of the present invention is to provide a novel form of fitting designed to clamp or secure the resilient bars together at points intermediate their ends and to serve as pivotal mountings between the bumper proper and the brackets or hangers extending forwardly from the ends of the automobile frame members to which the bumper is attached.

A further object of the invention is to provide a type of clamping fitting which may be adjustable lengthwise of the bumper bars in order to allow for the mounting of the bumper on different makes of vehicles which vary as to the distance between the frame members, as well as one which may be reversed in its application to the bumper bars so that the distance between the fittings may be properly proportioned regardless of the fixed distance between the side frame members of the automobile.

A preferred embodiment of the invention is disclosed in the accompanying drawings, in which:

Figure 1 is a top plan view of the bumper equipped with the fitting embodied in the invention.

Fig. 2 is a view in front elevation of the bumper.

Fig. 3 is an enlarged view of a single fitting shown in front elevation.

Fig. 4 is an enlarged detail section of the fitting taken on line 4—4 of Fig. 3.

Fig. 5 is an enlarged detail view in rear elevation of the fitting.

Fig. 6 is a perspective view of one of the clamping members of the fitting, and

Fig. 7 is a perspective view of the spacing plate between the clamping members of the fitting.

The type of bumper herein illustrated for the purpose of disclosing the features of the invention, consists of two parallel bars 1—1 of spring steel which extend the full length of the bumper in parallel and vertically spaced relation, and provide what is ordinarily known as the impact member of the bumper. These bars are preferably connected at their ends by means of pins or bolts 2—2 passing through the ends of the bars which are bent into the form of eyes as clearly shown in Fig. 1. At points spaced inwardly from the ends of the bars and on either side of the central portion thereof, are mounted the fittings 3—3 which will be presently described in detail. These fittings have direct and swivel connection with rearwardly extending arms 4—4, having suitable connection with the ends of frame members 5—5 extending longitudinally of the automobile. The arms 4—4 are preferably provided with laterally extending loops intermediate their ends for the purpose of affording increased resiliency. However, it is to be understood that any form of hanger or bracket may serve as the intermediate connecting members between the forward ends of the frame members 5—5 and the fittings 3—3.

Referring now to the construction of the fittings 3—3, each consists primarily of a pair of clamping members 6—6 disposed one above the other and connected together and in clamping engagement with the bars 1—1 by means of a central spacing plate 7 and a bolt 8 passing through ears or lugs 9—9 formed integral with the clamping members 6—6. Each of the clamping plates 6 of the single fitting is a solid cast or forged metal member having the structural features shown in Fig. 6, the lower clamping member being merely a reversal of the upper member. Each clamping member comprises a rectangular plate having at its top (or bottom) edge a laterally extending flange 11 in which is formed a downwardly (or upwardly) facing slot $11^a$ extending transversely of the plate and along its front face, the bottom edge of the flange immediately forwardly of the slot being preferably curved for ornamental purposes, as clearly shown in Fig. 2. In the bottom edge of the plate 10 and centrally thereof is formed a semi-circular recess 12 to allow for the passage of a bolt, as will presently be described. At one of the side edges of the plate 10 is formed an integral lug 13 which, as shown in Fig. 5, is offset laterally from the center of the plate and adjacent a side edge thereof and projects rearwardly therefrom. Within the lug is formed a bolt hole 13ᵃ. The lug is supported and strengthened by means of reinforcing webs 14 suitably arranged in location and number.

Inasmuch as each fitting is made up of a pair of like clamping members 6—6, it follows that while they are substantially identical they must be made in "rights" and "lefts" so that the lugs of each clamping member will be located on the same side of the fitting and above one another when the same are assembled to engage the bumper bars. Thus as clearly shown in Fig. 4 one of the clamping members engages the top bar 1 with the plate 10 bearing flatwise against the rear face thereof and the flange portion 11 hooking over the upper edge of the bar. Similarly the lower clamping member engages the lower bar 1 in the same manner, but with its flanged portion 11 hooking over the lower edge of the lower bar. Thus positioned the lugs 9—9 of each clamping member are disposed in vertical alinement so that the bolt 8 will pass through the bolt holes thereof. The vertical distance between the lugs 9—9 of the clamping members is substantially equal to the width of one of the bars 1—1 so that the central portion of the bolt 8 is exposed and forms the bearing for the forward ends of the hangers 4—4 which may be suitably attached in swivel or pivotal connection with the bolts 8 by bending an eye at the ends of the bars 4—4 through which the bolt may pass. However, as before pointed out, the particular manner in which the pivotal connection between the bolt 8 of the fittings and the attaching bars or hangers 4—4 is made, is not important.

Since the clamping members have no direct contact with each other along their lower edges other than through the medium of a bolt 8, it is manifest that in the absence of additional clamping means centrally of the fitting that in tightening up the bolt 8 the clamping members as well as the bars 1—1 would be readily thrown out of vertical alinement. To overcome this and to otherwise obtain perfect clamping engagement with the bars 1—1, the intermediate spacing plate 7 is made a part of the fitting. This spacing plate as clearly shown in Fig. 7, is a square plate provided along two of its opposite edges with lugs 7ᵃ—7ᵃ projecting at right angles to what is the rear face of the plate. At the center of the plate is formed a square hole 7ᵇ and as it is clearly shown in Figs. 3 and 4, this spacing plate is applied against the outer faces of the bumper bars 1—1 in such a way as to locate the lugs 7ᵃ—7ᵃ in a vertical position and between the bars 1—1 with their ends abutting against the inner edges of said bumper bars. Passing through the square hole 7ᵇ of the plate 7 is a tapered headed bolt 15 extending rearwardly and between the adjacent edges of the clamping member at the rear of the bumper bars, this being possible by the provision of the semi-circular recesses 12—12 which together form a circular opening. A nut 16 is applied to the rear end of the bolt 15 and when screwed tightly against the adjacent marginal portions of the clamping members draws the entire structure into perfect vertical alinement as well as clamps the complete fitting tightly to the bars 1—1 of the bumper.

Assuming then that a bumper is equipped with a pair of the fittings just described, it is obvious that in mounting the bumper upon a vehicle they can be readily adjusted lengthwise of the bumper by loosening the bolts 8 and 15, and when properly adjusted can again be tightened. This adjustment can be made when the distances are not so great as to materially change the spacing between the fittings. However, in some instances the distance that the fittings may be shifted lengthwise of the bumper in order to make the installation, is such that in the absence of additional means of adjustment the fittings would be so close together or so far apart as to materially reduce the effectiveness of the bumper. To bring this out more clearly, it is obvious that if the fittings are brought too close together the bumper is weakened at its ends, and if they are spread too far apart the central portion of the bumper will be weakened. In other words, it is desirable to locate the fittings approximately one-third the distance inwardly from the ends of the bumper regardless of the distance between the frame members 5—5 which determine the approximate points of attachment. Assuming then that for normal conditions of installation the lugs 9—9 of each of the pair of fittings are located on the inner sides thereof, as shown in Fig. 1, it may become necessary to mount the bumper on a vehicle in which the distance between the side frame members 5—5 is much greater than the average. To mount the bumper on such a vehicle with the fittings arranged as shown in Fig. 1, it at once becomes obvious that it would be necessary to move the fittings toward the ends of the bumper and in doing so would materially weaken a portion of the bumper between the fittings. The fittings, however, are reversible and by reason of the fact that the lugs 9—9 are offset to one side of the fittings the same may be interchanged so that the lugs will be located on the outside instead of on the inside as shown in dotted lines in Fig. 1. By reason then of this interchange or reversal of the fittings, the bumper may be mounted on the vehicle without displacing the fittings from their normal location. In other words, regardless of the distance between the frame members to which the bumper is attached, the variation can be compensated for without appreciably displacing the fittings. In this way a bumper equipped with the fittings herein disclosed becomes more flexible and adaptable for almost universal application to all makes and styles of automobiles.

Having set forth the features of the invention and the advantages derived therefrom, I claim as my invention:

1. A bumper comprising an impact member, arms extending transversely of said impact member and adapted to be attached to a vehicle, and intermediate connecting fittings having clamping engagement with said impact member and pivotal connection with the ends of said arms at points offset rearwardly from said impact member and laterally from the centers of said fittings.

2. A bumper comprising an impact member, arms extending transversely of said impact member and adapted to be attached to a vehicle, and intermediate connecting fittings having detachable engagement with said impact member and pivotal connection with the ends of said arms through the medium of pivot bolt supporting members extending rearwardly and offset laterally from the central portion of said fittings.

3. An automobile bumper comprising an impact member and a fitting adapted to be mounted upon said impact member intermediate its ends and comprising clamping members engaging said impact member and provided with lugs offset laterally from the central vertical axis of said fitting and extending rearwardly from said members, a pivot bolt extending between said lugs, and a rearwardly extending hanger having pivotal connection with said bolt.

4. A bumper comprising an impact member consisting of resilient bars spaced apart vertically throughout the central portion thereof and fittings having clamping engagement with said bars on either side of said central portion, each of said fittings comprising a pair of clamping members located one above the other and provided with hook portions adapted to engage the outer edges of the adjacent bars and with rearwardly projecting lugs offset laterally of the vertical central axis of the fittings, and means supported by said lugs for connecting said fittings with the frame members of an automobile.

5. In an automobile bumper, comprising a resilient impact member, fittings embracing said impact member at points intermediate the ends thereof, each of said fittings being provided with a pair of vertically spaced lugs extending rearwardly and offset laterally from the point of connection of said fittings with said impact member and arms pivotally connected with said fittings through the medium of bolts passing through said lugs.

6. A bumper comprising an impact member, fittings detachably mounted on said impact member in spaced relation thereon, arms extending transversely to said impact member for attachment to a vehicle and having pivotal connection with said fittings at points offset laterally from the centers thereof whereby the distance between the points of pivotal connection may be varied without substantially altering the spacing of said fittings.

7. A bumper comprising an impact member, a pair of fittings clamped to the impact member inwardly from the ends thereof, and arms adapted for attachment to a vehicle and pivotally secured at their free ends to said fittings at points offset laterally from the centers thereof, whereby the distance between the points of connection may be varied without substantially altering the position of said fittings on said impact member.

8. An automobile bumper comprising resilient bars extending lengthwise of the bumper and in vertically spaced relation and fittings arranged transversely of said bars and located on opposite sides of the central portion thereof, each of said fittings comprising a pair of clamping members having abutting engagement with the rear faces of each of said bars and provided with marginal hook portions engaging the remote edges thereof, said clamping members having substantially abutting engagement at their adjacent edges between said bars, a plate adapted to be applied to the outer faces of said bars and overlapping the adjacent edges thereof, a bolt passing through said plate and adapted to be tightened against the adjacent marginal portions of said clamping members, and lugs formed integral with said clamping members adjacent the corresponding side edges thereof and extending rearwardly for attachment to the automobile frame members.

Signed at Pittsburgh, Pa., this 8th day of July, 1924.

WILLIAM R. McGOWEN.